Figure 1:
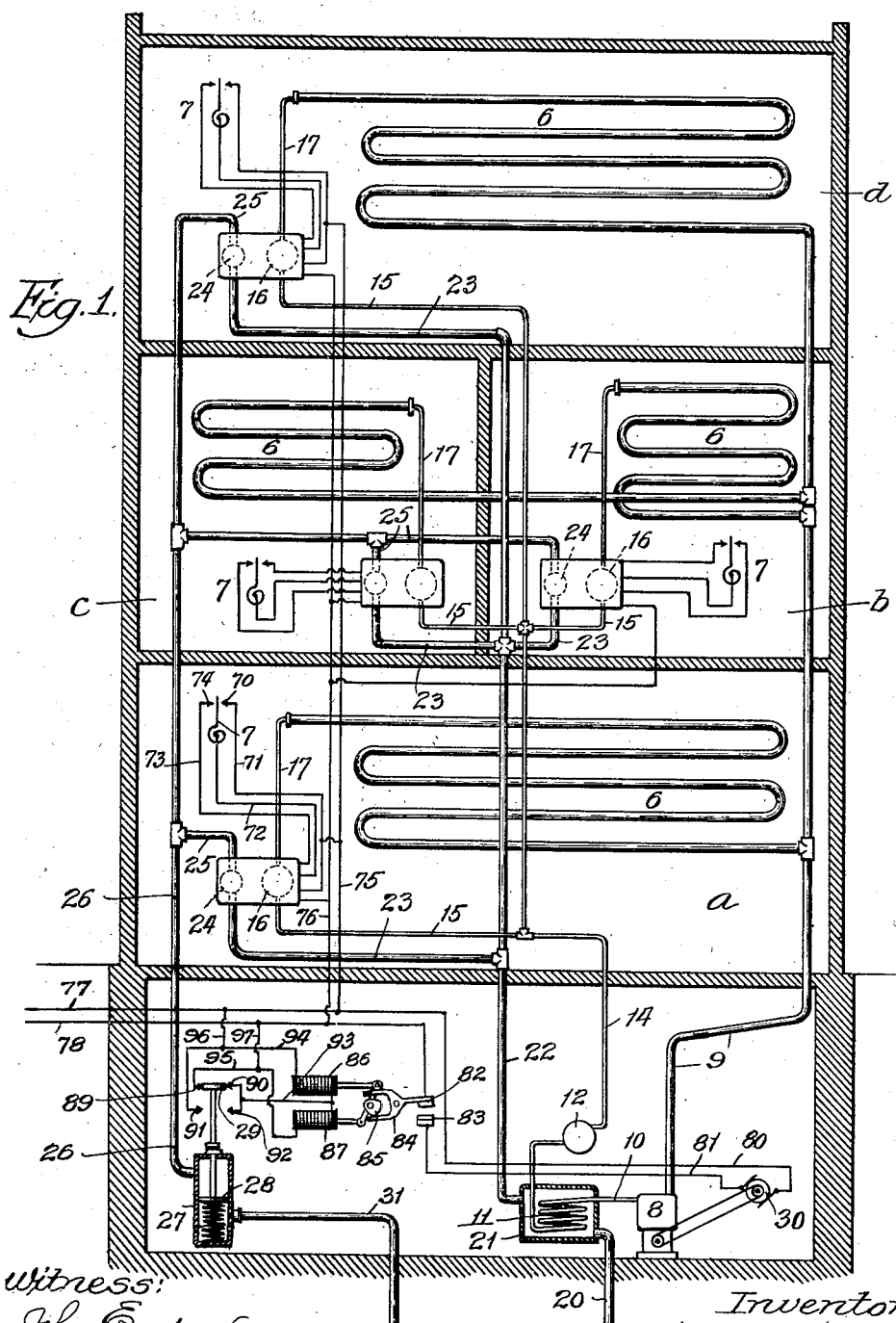

C. C. HANSEN.
REFRIGERATING APPARATUS.
APPLICATION FILED MAY 19, 1916.

1,330,866.

Patented Feb. 17, 1920.
3 SHEETS—SHEET 1.

Witness:
John Enders

Inventor:
Charles C. Hansen
By Fred Gerlach
his Atty.

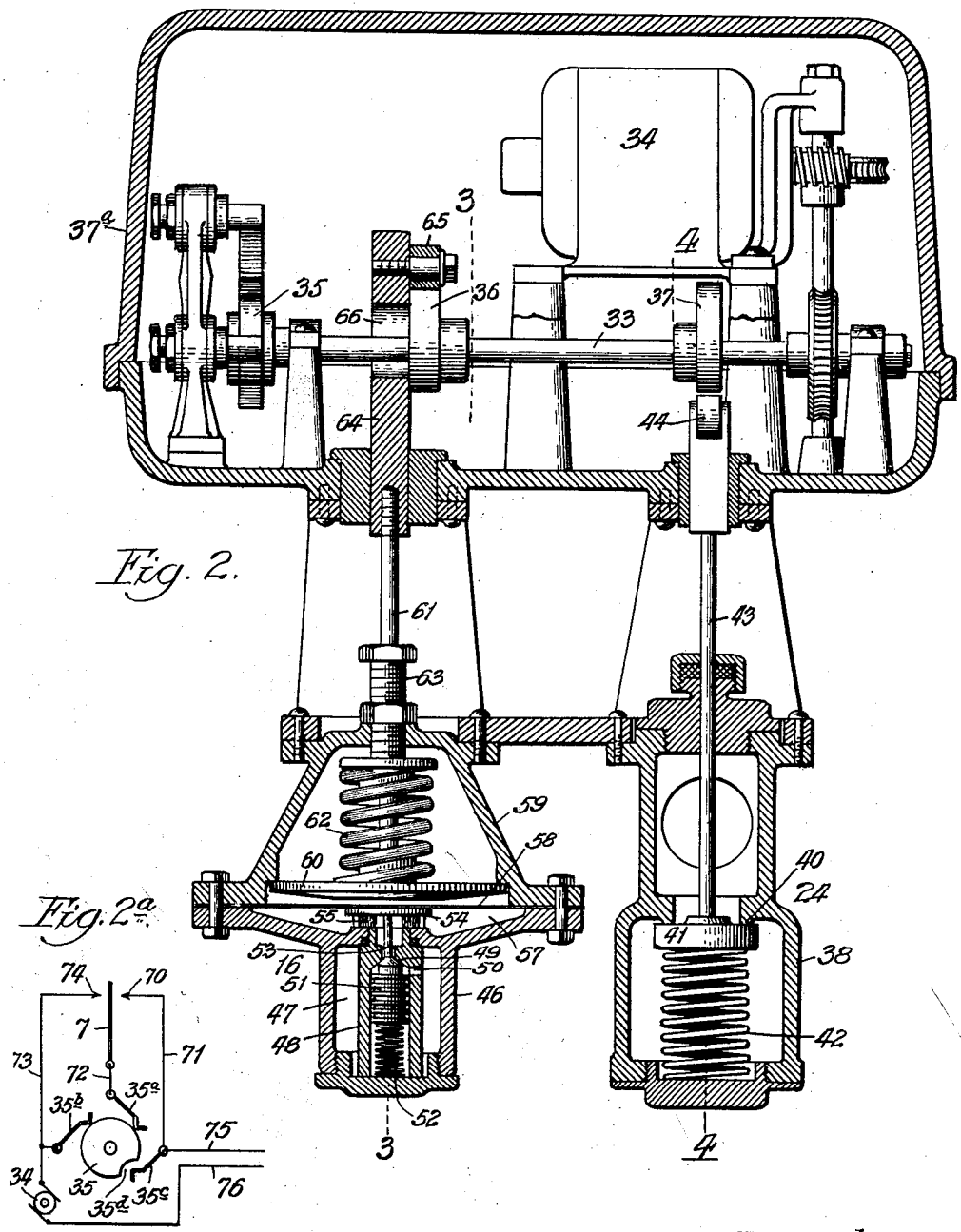

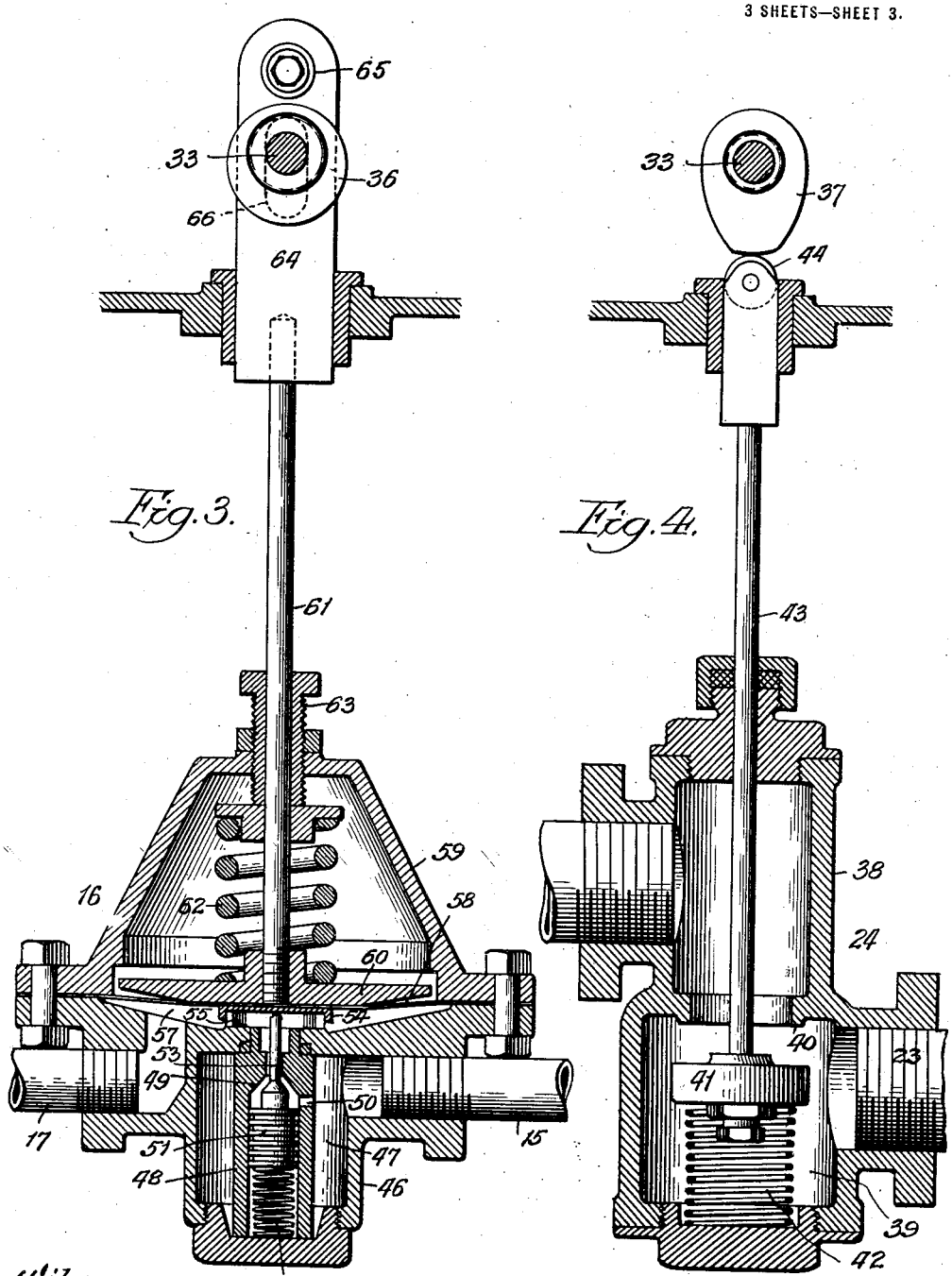

UNITED STATES PATENT OFFICE.

CHARLES C. HANSEN, OF FOREST PARK, ILLINOIS, ASSIGNOR TO REFRIGERATING SPECIALTIES COMPANY, OF CHICAGO, ILLINOIS, A CORPORATION OF ILLINOIS.

REFRIGERATING APPARATUS.

1,330,866.  Specification of Letters Patent.  Patented Feb. 17, 1920.

Application filed May 19, 1916. Serial No. 98,546.

*To all whom it may concern:*

Be it known that I, CHARLES C. HANSEN, a citizen of the United States, and a resident of Forest Park, in the county of Cook and State of Illinois, have invented certain new and useful Improvements in Refrigerating Apparatus, of which the following is a full, clear, and exact description.

The invention relates to refrigerating apparatus.

One object of the invention is to provide improved regulation for a system including several separate refrigerating units operated by a single compressor in which provision is made for individually controlling the units responsively to temperature fluctuations.

The invention contemplates controlling the operation of the compressor by the pressure of cooling water used in condensing the refrigerant and utilizing the pressure in the water line to control the operation of the compressor.

Another object of the invention is to provide improved mechanism for controlling the supply of refrigerant to the several units, which is conjointly controlled by suction pressure in the low pressure side of the refrigerant line and a starting motor.

Other objects of the invention will appear from the description of the system.

The invention consists in the several novel features hereinafter set forth and more particularly defined by claims at the conclusion hereof.

In the drawings: Figure 1 is a diagrammatic view of a refrigerating system embodying the invention. Fig. 2 is a vertical section through the controlling mechanism for one of the refrigerating units. Fig. 2ª is a diagram of the thermostatically controlled circuits for one of the controlling motors. Fig. 3 is a section taken on line 3—3 of Fig. 2 and Fig. 4 is a section taken on line 4—4 of Fig. 2.

The invention is designed more particularly for a refrigerating system in which there is a plurality of separately controlled refrigerating units for separate rooms or compartments, a common compressor and condenser for the entire system and controlling mechanism whereby temperature fluctuations in the rooms will control the operation of compressor.

In the diagram (Fig. 1), the system comprises separate refrigerating units $a$, $b$, $c$ and $d$ located in separate rooms. Each refrigerating room contains a suitable refrigerant-coil 6 connected to a refrigerant valve, and a thermostat 7 for controlling the electrical connections for a controlling motor 34. A refrigerant valve 16 is provided for each unit. A water valve 24 is also provided for each unit. A compressor 8 serves to supply refrigerant to all of the refrigerating coils in the system. The refrigerant line comprises a low pressure main 9 which is connected to all of the refrigerant-coils 6 and leads into the compressor, and a high pressure main 14, which is connected by branches 15 to all the refrigerant valves 16 for the several units, is connected to a receiver 12. A condenser-coil 11 is connected to the receiver, and a pipe 10 leads from the compression side of the compressor to the condenser. Each valve 16 is connected by a pipe 17 to a refrigerant coil 6.

The invention designs to utilize the pressure of the water supplied to the refrigerating system, usually for condensing, to individually control the motor for operating the compressor. Water is supplied to the system by a pipe 20 which delivers the water into the condenser-tank 21. A main 22 conducts water from the condenser to branches 23 which are connected to the water-valves 24, respectively. From valves 24, the water passes through branches 25 to a return-main 26 which delivers the water after it has passed through the system into a casing 27 which contains a plunger 28 adapted to be operated by water-pressure to operate a switch-member 29 which controls a current for the operation of the motor 30 which is suitably connected to drive the compressor 8. After having passed through the system, the water is discharged from the chamber 27 through pipe 31.

The foregoing exemplifies a system comprising a series of refrigerating units each having a refrigerating coil, thermostat, refrigerant valve, water valve and a controlling motor. A single compressor, condenser, motor and motor-controlling device are included in the system to operate all of the individual units so that the units will be operated separately in response to the temperature fluctuations in the respective rooms.

The controlling mechanism for each refrigerating unit comprises a shaft 33 suitably geared to motor 34, and a controller disk 35 secured to said shaft to cause said shaft to be operated in cycles of one-half a revolution each. The details of this controlling mechanism and gearing for operating the shaft 33 are more fully set forth in an application filed by me Feb. 23, 1916, serial No. 79,813 to which reference may be had for such details. The shaft 33 is provided with a cam 36 for operating the refrigerant valve 16. The motor 34, controller 35, shaft 33 and its connections are inclosed in a suitable case 37ª. The water-valve 24 comprises a casing 38 having an inlet chamber 39 to which a supply-branch 23 is connected, a valve seat 40, a valve-plunger 41, a spring 42 for normally closing said plunger, a stem 43 secured to the plunger and extending upwardly to a point adjacent the cam 36, where it is provided with a roller 44 adapted to be operated by said cam 36 so that the plunger 41 will be alternately opened and closed during the successive half revolutions of shaft 33.

Each refrigerant-valve 16 comprises a casing 46 to one side of which a branch 15 of the high pressure side of the refrigerant line is connected and to the other side of which a branch 17 of the low pressure side of the refrigerant line is connected. The high pressure refrigerant from pipe 15 is delivered into a chamber 47 containing a sleeve 48 suitably fixed in the casing 46 and containing a valve seat 49 in communication with the chamber 47 by a port 50. A valve-plunger 51 mounted in the sleeve 48 and normally closed by a spring 52 disposed below the valve, is adapted to close the valve at seat 49. Valve-plunger 51 is provided with an upwardly extending stem 53 which is adapted to be engaged by a vertically slidable cap 54 which is guided on lugs 55 on casing 46. A chamber 57 formed in the upper portion of casing 46 is in communication with the low-pressure refrigerant pipe 17, and valve-plunger 51 when open, permits the high pressure refrigerant under reduced pressure to pass into said chamber 57. The top of chamber 57 is formed by a diaphragm 58 secured between casing 46 and a hood 59 on the top thereof. This diaphragm is exposed to the pressure of the refrigerant under low pressure. The high pressure fluid entering the chamber 57 will be impacted against plate 54 which will assist in breaking up and vaporizing the fluid. A head 60 is disposed above the diaphragm 58 and is adapted to engage the diaphragm to force it downwardly to lower cap 54 and open the valve 51. Head 60 is secured to a stem 61 suitably guided in hood 59 and a spring 62 in said hood is applied to force the diaphragm downwardly when the pressure in chamber 57 and the low pressure side of the refrigerant line is reduced by suction from the compresssor. The force of spring 62 may be adjusted by a sleeve nut 63. The upper end of stem 61 is connected to a slide 64 which is suitably guided in casing 37 and is provided with a roller 65 adapted to be operated by the cam 36 on shaft 33. Slide 64 is provided with an elongated slot 66 through which shaft 33 passes. When the refrigerating unit is at rest, cam 36 of its controlling mechanism will be in position shown in Fig. 2 of the drawings, and will hold head 60 raised against the force of spring 62, and as a result, spring 52 will hold valve-plunger 51 closed so that communication between the high pressure side and the low pressure side of the line will be cut off. When shaft 33 is operated the first cycle under thermostatic control, as hereinafter set forth, cam 36 will be rotated to release roller 65 and the head 60. The operation of the diaphragm 58 will depend, however, upon the suction pressure in the low pressure side of the refrigerant line of the refrigerating unit. When the compressor is in operation, it will create sufficient suction in the low pressure side of the line to permit spring 62 to force head 60 and diaphragm 58 downwardly to open valve plunger 51. As soon, however, as the compressor stops, the pressure in the chamber 57 will be sufficient to overcome the force of spring 62, thus lifting head 60, stem 61 and roller 65 and causing spring 52 to close valve-plunger 51 and cut off communication between the high pressure side and the low pressure side of the refrigerant line. When shaft 33 has been operated another cycle or half revolution, cam 36 will be rotated into position to lock the head 60 in raised position.

Each controller 35 has associated therewith three brush-contacts 35ª, 35ᵇ, and 35ᶜ. Contact 35ᶜ is connected to a thermostat-contact 70 by a conductor 71. Contact 35ª is connected by conductor 72 to the thermostat 7 and contact 35ᵇ is connected by a conductor 73 to a thermostat-contact 74 which is also connected to one of the brushes for the motor 34. Current is supplied to the thermostatically controlled circuit through motor 34 by conductors 75 and 76 which are connected to the line-conductors 77 and 78 respectively. Each controller 35 controls a circuit for a motor 34 which operates the water-valve and the refrigerant valve of one refrigerating unit. When the unit is at rest, the water valve 24 and the refrigerant valve 16 will both be closed and the controller will be in the position shown in Fig. 2ª. The motor 34 will be at rest because the circuit therefor will be open. When the temperature in a refrigerating room rises to the predetermined maximum, its thermostat 7 will touch contact 70, whereupon a circuit for causing the operation of motor 34 of the controlling mechanism for said room will be established as follows: Line conductor 77, conductors 75, 71, contact 70, thermostat 7, conductor 72, contact 35$^a$, controller 35, contact 35$^b$, conductor 73, motor 34, conductor 76, and line-conductor 78. The motor 34 will then operate to rotate shaft 33 one half revolution. Controller 35 is provided with an interrupter notch 35$^d$ which is normally in position to break the contact between the controller and the contact 35$^c$. When the shaft 33 has completed a half revolution, the notch 35$^d$ will be brought into position to be disposed at contact 35$^b$, whereupon said circuit will be interrupted causing the motor 34 to stop. When shaft 33 has been thus operated, cam 37 will hold open the water valve 41 and cam 36 will release roller 65 and stem 61 to the lower end of which head 60 is attached, so that spring 62 will, when its force preponderates the pressure in the chamber 57, cause head 60 to force the diaphragm 58 downwardly to open the refrigerant-valve 51.

When the temperature in the refrigerating room has been lowered to the desired maximum, thermostat 7 will move against contact 74 and establish a circuit for the operation of motor 34 as follows: Line conductor 77, conductor 75, contact 35$^c$, controller 35, contact 35$^a$, conductor 72, thermostat 7, contact 74, conductor 73, motor 34, conductor 76 and line-conductor 78. The operation of motor 34 will continue until notch 35$^b$ passes into normal position adjacent contact 35$^c$ and until shaft 33 has been rotated a half-revolution to cause cam 37 to permit water-valve 41 to close and to operate cam 36 into position to lock the stem 61 and head 58 in raised position.

The operation of the controlling mechanism for each of the several units will be the same and when the water valve 24 of any one of the refrigerating units is open, water, if present in the supply system, will flow to pipe 26 and into casing 27 to operate plunger 28 which is connected to the switch 29 for controlling the motor for driving the compressor.

The brushes of motor 30 which drives the compressor, are connected by conductors 80 and 81 to the line-conductors 77 and 78 respectively, and normally separated switch-contacts 82 and 83 are included in conductor 81. Contact 82 is mounted on a lever 84 which is adapted to be operated by a cam 85. A double solenoid magnet comprising helices 86 and 87 has an armature operatively connected to cam 85, so that by alternately energizing said helices, lever 84 will be shifted to close and open contacts 82 and 83 for the circuit for the motor 30. Switch-member 29 in one of its alternative positions is adapted to bridge a pair of contacts 89 and 90 and in its other position is adapted to bridge a pair of contacts 91 and 92. A conductor 93 connected to both of the helices 86 and 87 is connected to contacts 90 and 92. A conductor 94 connects the helix 86 and contact 91 and a conductor 95 connects contact 89 and helix 87. Conductor 94 is connected by a branch 96 to line conductor 77 and conductor 95 is connected by a branch 97 to line conductor 78. The motor 30 will be at rest when plunger 28 is in its normal position. When there is no water-pressure in casing 27, switch member 29 will close a circuit for holding the switch lever 84 open. Said circuit will be as follows: line conductor 77, conductors 96 and 94, helix 86, conductor 93, contact 90, switch member 29, contact 89, the conductors 95, 97 and line-conductors 78. This circuit energizes the solenoid to hold the switch-lever 87 open, so that the circuit for motor 30 will be open at 82, 83. When the switch member 29 is operated by water pressure in the chamber 27, said member will be shifted into position to bridge contacts 91 and 92, establishing a circuit to operate the solenoid to close contacts 82, 83, as follows: line conductor 77, conductors 96, 94, contact 91, member 29, contact 92, conductor 93, helix 87 to cause its armature to shift cam 85 into position to operate lever 84 to close the contacts 82, 83 of the circuit for the motor 30 which drives the compressor. This circuit will remain closed so that the motor 30 will operate the compressor until plunger 28 is restored to normal position shown in Fig. 1, which occurs when the supply of water to casing 27 is cut off, which results from the closing of the water-valves 24.

The operation of the system will be as follows: Assuming the temperature in all of the refrigerating rooms to be above the predetermined minimum, the compressor will be at rest, the water-valves 24 and the refrigerating valves 16 will be closed, so that there will be no pressure in the pipe 26 and in casing 27 which contains the plunger 28 for operating the switch-member 29. Cams 36 will then hold heads 60 raised, so that the springs 62 will be inoperative to open the refrigerant-valves 51 and cams 37 will be in position to permit the valves 41 to be held against seats 40 by springs 42. If the temperature in any of the refrigerating rooms $a, b, c, d$ should rise above the predetermined maximum, rendering circulation of refrigerant necessary, the thermostat 7 for that room will close the circuit for the controlling motor for that room as hereinbefore described and cause the operation of the motor 34 controlled by that thermostat. For example, if the thermostat 7 in the refrigerating room $d$ should operate responsively to a rise in temperature, the circuit for causing the motor 34 connected to that thermostat would be closed, so that the shaft 33 operated by said motor will be operated one-half revolution, causing the cam 37 thereon to lower valve-plunger 41 and cam 36 on said shaft to release the head 60 controlled thereby. When the valve-plunger 41 for that unit is open, water under pressure will flow from pipe 20 through condenser-tank 21, pipe 22, branch 23 for the controlling mechanism of the refrigerating unit $d$, through valve 24 and pipe 26 into and through the casing 27 and be discharged through the pipe 31. The pressure of this water will operate plunger 28 to shift switch member 29 so it will be bridged across contacts 91 and 92 to establish the circuit hereinbefore described for operating the solenoid to close contacts 82 and 83. Thereupon, the circuit for the operation of the motor 30 will be closed and said motor will operate the compressor 8 until the circuit is again opened. If the water-supply in the pipe 20 should fail or if there is a deficiency in the pressure, plunger 28 in casing 27 will not be operated so that the motor 30 will remain inoperative. As a result, the compressor will not be operated unless there is a sufficiency in the water supply for proper operation of the refrigerating system. When the compressor 8 is in operation, it will produce a suction pressure in the low-pressure side of the refrigerant line and through the refrigerating valve 24 of the refrigerating unit $d$. This suction will be sufficient to cause the spring-pressed head 60 which has been released by the cam 36 to force its diaphragm 58 downwardly, thus causing the cap 54 to force the stem 53 of the valve 51 downwardly and into open position, so that refrigerant from the high pressure side of the line will pass through the refrigerant valve casing, branch pipe 17 and coil 6 of the refrigerating unit $d$ and through main 9 to the compressor 8 which will compress the refrigerant and force it through condenser 11 and into the receiver 12. When the refrigerant has been circulated through the coil of the unit $d$ sufficiently to lower the temperature to the predetermined minimum, the thermostat 7 for controlling that unit will establish the circuit hereinbefore described for again operating motor 34 for a sufficient period to operate the shaft 33 a one-half revolution. Then, cam 37 will be in position to permit spring 42 to close valve-plunger 41 and cam 36 will lift the spring-pressed head 60 and lock it in raised position so that the spring 52 will close the refrigerant valve 51. As soon as the water-valve 24 is closed, water will cease to flow through the return main 26 and plunger 28 in casing 27 will be shifted by its spring to restore switch-member 29 into normal position shown in Fig. 1. Thereupon, a circuit will be established through the solenoid to shift lever 84 to open the circuit for operating the motor 30, thus discontinuing the operation of the compressor 8.

It will be understood that all the units will operate in the same manner responsively to their thermostats for controlling them, so that it is not deemed necessary to describe the operation of each unit.

It will also be understood that if the temperature in a plurality or all of the units should simultaneously rise, all of them will be simultaneously operated. In all instances, the operation of the compressor is dependent upon sufficient water pressure in the water line.

The invention exemplifies a refrigerating system comprising a plurality of separately controlled refrigerating units and a single compressor, condenser and refrigerating line to which all of the units are connected and in which the operation of the motor is controlled by water-pressure in the system. The system also exemplifies one in which several of the separately controlled units may be simultaneously operated. Also one in which the refrigerating valve is conjointly operated by the controlling motor and the suction caused by the compressor in the low-pressure side of the refrigerant line.

The invention is not to be understood, as restricted to the details set forth, since these may be modified within the scope of the appended claims, without departing from the spirit and scope of the invention.

Having thus described the invention, what I claim as new and desire to secure by Letters Patent, is:

1. In an automatic refrigerating system, the combination of a plurality of refrigerating units, a refrigerating line connected to said units, a compressor connected to said refrigerant line, a condenser, a motor for operating the compressor, means for supplying cooling liquid to the condenser, means for separately controlling the operation of the refrigerating units, including devices for controlling the flow of cooling liquid, and means operated by the cooling water controlled by said devices for collectively controlling the operation of said motor.

2. In an automatic refrigerating system, the combination of a plurality of refrigerating units, a refrigerating line connected to said units, a compressor connected to said refrigerant line, a condenser, a motor for operating the compressor, means for supplying cooling liquid to the condenser, thermostatic means for separately controlling the operation of the refrigerating units, controlling devices for the cooling liquid controlled by said thermostatic means, and controlling means for the motor operated by the cooling liquid which passes through said controlling devices.

3. In an automatic refrigerating system, the combination of a plurality of refrigerating units, controlling mechanism for each unit comprising a motor, a water valve operated by said controlling motor and a refrigerant valve, a compressor, a motor for operating said compressor, a refrigerant line connected to the compressor and to all of said units, means for supplying cooling liquid to the system and to said water-valves, and means controlled by the flow of cooling water through said valves for automatically controlling the operation of the compressor-driving motor.

4. In an automatic refrigerating system, the combination of a plurality of refrigerating units, controlling means for each unit comprising a controlling motor, a water-valve operated by said starting motor, a refrigerant valve and a thermostat, a compressor, a motor for operating said compressor, a refrigerant line connected to the compressor, and to all of said units, means for supplying cooling liquid to the system and to said water valves, and means controlled by the flow of cooling water through said valves for automatically controlling the operation of the compressor driving motor.

5. In an automatic refrigerating system, the combination of a plurality of refrigerating units, controlling means for each unit comprising a thermostat and a controlling motor, water-valves, refrigerant valves controlled by the controlling motors respectively, a compressor, a refrigerant line connected to the compressor and to all of the refrigerant valves, a line for supplying cooling liquid to the system connected to all of said water valves, and means for controlling the compressor-driving motor to cause its operation when water is passing through any of the water valves.

6. In an automatic refrigerating system, the combination of a plurality of refrigerating units, controlling means for each unit comprising a thermostat and a controlling motor, water valves and refrigerant valves controlled by the starting motors respectively, a compressor, a refrigerant line connected to the compressor and to the refrigerant valves of all of said units, a line for supplying cooling liquid to the system connected to all of said water-valves, a switch for controlling the compressor-driving motor, and switch-controlling means operated by water passing through the water line.

7. In an automatic refrigerating system, the combination of a compressor, a refrigerant line connected to said compressor, a thermostatically controlled motor, a refrigerant valve having a chamber therein connected to the low pressure side of the refrigerant line and means conjointly controlled by said motor and the refrigerant in the low pressure side of the refrigerant line.

8. In an automatic refrigerating system, the combination of a compressor, a refrigerant line connected to said compressor, a thermostatically controlled motor, a refrigerant valve having a chamber therein connected to the low pressure side of the refrigerant line, a diaphragm in said chamber for opening said valve, and means for operating the diaphragm controlled by the motor, said diaphragm being operable by pressure in the low pressure side of the refrigerant line.

9. In an automatic refrigerating system, the combination of a compressor, a refrigerant line connected to said compressor, a thermostatically controlled motor, a spring-closed refrigerant valve having a chamber therein connected to the low presure side of the refrigerant line, spring-pressure means for opening said valve controlled by pressure in the low pressure side of the refrigerant line, and means controlled by the motor for closing said valve.

10. In an automatic refrigerating system, the combination of a compressor, a refrigerant line connected to said compressor, a thermostatically controlled motor, a spring-closed refrigerant valve having a chamber therein connected to the low pressure side of the refrigerant line, spring-closed means for opening said valve comprising a diaphragm controlled by pressure in the low pressure side of the refrigerant line, and spring-pressed means controlled by the motor for closing said valve.

11. In an automatic refrigerating system, the combination of a compressor, a motor for operating the compressor, a thermostatically controlled motor, a refrigerant valve, a refrigerant line connected to said refrigerant valve and the compressor, the latter having a chamber therein connected to the low pressure side of the refrigerant line, spring-pressed means for opening said valve, and a cam for locking the spring-pressed means in inoperative position and operated by the thermostatically controlled motor, said means being controlled by the suction pressure in said chamber.

12. In an automatic refrigerating system, the combination of a compressor, a motor for operating the compressor, a thermostatically controlled motor, a refrigerant valve, a refrigerant line connected to said refrigerant valve and the compressor, the latter having a chamber therein connected to the low pressure side of the refrigerant line, spring-pressed means for opening said valve, a diaphragm operated by said means, a cam for locking the spring-pressed means in inoperative position and operated by the thermostatically controlled motor, said diaphragm being controlled by the suction pressure in said chamber.

CHARLES C. HANSEN.